United States Patent [19]

McManus et al.

[11] Patent Number: 4,835,395
[45] Date of Patent: May 30, 1989

[54] CONTINUOUS AQUEOUS TRITIUM MONITOR

[75] Inventors: Gary J. McManus; Forrest J. Weesner, both of Idaho Falls, Id.

[73] Assignee: The United States of America as represented by the United States Department of Energy, Washington, D.C.

[21] Appl. No.: 109,654

[22] Filed: Oct. 19, 1987

[51] Int. Cl.$^4$ ............................................. G01N 23/12
[52] U.S. Cl. ............................ 250/435; 250/432 R; 250/364
[58] Field of Search ................... 250/435, 432 R, 364, 250/304, 380

[56] References Cited

U.S. PATENT DOCUMENTS 4,504,737  3/1985  Cox et al. ........................... 250/435
4,618,774  10/1986  Hascal et al. ....................... 250/304

OTHER PUBLICATIONS

"A Continuous Tritium Monitor for Nuclear Facility Off-Gas Streams", ENICO 1022, Jun. 1980, Exxon Corp. for U.S. Dept. of Energy.
"Seperation of HT, Noble Gases, and HTO Vapor with Semi-permeable Membranes", Howell et al., *Nuc. Instrum. and Methods*, vol. 124, (1975), pp. 579–583.
"A Monitor for the Separate Determination of HT and HTO", McElroy et al., *IEEE Trans., Nuc. Sci.*, NS-29, (1982), No. 1, Feb. 1982, pp. 816–818.
"Tritium Measurement Techniques", NCRP Report No. 47, May 1976.
"Application of Air Proportioned Counters to a Tritium in Air Monitor", Aoyama et al., *Nuc. Instrum & Methods*, A-254, (1987), pp. 620–626.
"Tritium Control Technology", Rhinehammer et al., for U.S.A.E.C. by Monsanto Research Corp., WASH-1269, Dec. 1973.

*Primary Examiner*—Janice A. Howell
*Assistant Examiner*—William F. Rauchholz
*Attorney, Agent, or Firm*—James W. Weinberger; Thomas G. Anderson; Judson R. Hightower

[57] ABSTRACT

An apparatus for a selective on-line determination of aqueous tritium concentration is disclosed. A moist air stream of the liquid solution being analyzed is passed through a permeation dryer where the tritium and moisture and selectively removed to a purge air stream. The purge air stream is then analyzed for tritium concentration, humidity, and temperature, which allows computation of liquid tritium concentration.

12 Claims, 2 Drawing Sheets

CONTINUOUS AQUEOUS TRITIUM MONITOR

The United States has rights in this invention pursuant to Contract No. WINCO-203911 between the United States Department of Energy and Westinghouse Electric Corporation.

This application relates to a method and apparatus for measuring tritium concentration in a liquid effluent, and more particularly, to on-line monitoring of tritium in aqueous process streams.

BACKGROUND OF THE INVENTION

Tritium is one of the most environmentally significant radioisotopes emitted from nuclear fuel reprocessing plants and waste solidification facilities. Tritium is difficult to measure in real time due to its weak beta radiation, its many chemical forms (HT, HTO, $CH_3T$) and the presence of other radioactive and nonradioactive constituents in the off-gas stream. For example, the off-gas stream from a typical waste solidification facility contains oxides of nitrogen, particulate activities, water vapors, $^{14}C$ and $^{85}Kr$. In particular, the $^{14}C$ and $^{85}Kr$ have presences that are difficult to minimize in order to prevent these elements from biasing, the tritium measurement.

The need for tritium monitoring of effluents arises primarily from tritium generated in the coolant by neutron activation of deuterium. Ternary fission in the fuel and activation of impurities in the water are very minor contributors to the tritium inventory in the heavy water ($D_2O$) coolant. Tritium is generally present in heavy water as tritiated water (DTO), HTO, or $T_2O$ and follows the water pathway of the $D_2O$ such as that occurring from leaks, vaporization, and water adhering to surfaces of fuel rods and equipment removed during refueling. Tritium concentrations in the moderator-coolant may range from several hundred u Ci/ml at the National Bureau of Standards test reactor to 10,000-20,000 $\mu$Ci/ml in production reactors.

The purpose of monitoring can be resolved into three categories: (1) to measure the total release of tritium to the environment, assuring that emissions are within acceptable levels, (2) to measure the rate of release, which provides diagnostic information about the general operating performance of the plant, and (3) to prevent personnel exposure.

In the past, one manner of analyzing the tritium levels involved the conversion by catalytic oxidation, or other manner, of all forms of tritium to HTO, separating the HTO from the $^{85}Kr$ and $^{14}C$ and in measuring the tritium in a purified sample stream. Other means employed silica gel beds and molecular sieves. In general, the analysis for tritium in the effluent of a nuclear fuel reprocessing plant required that samples be collected and chemical separation and liquid scintillation analysis performed in the laboratory.

Accordingly, an object of the subject invention is the on-line continuous monitoring and analysis of tritium levels from the liquid effluent of a nuclear fuel reprocessing plant.

A further object of the subject invention is a means for analyzing tritium in a liquid effluent through the use of a semi-permeable membrane.

A still further object of the subject invention is a means for on-line continuous analysis of tritium concentrations from 1 to 1,000 u Ci/$M^3$ in the presence of other radioactive materials of varying concentration and identity.

These and other objects are obtained in accordance with the subject invention wherein there is provided a method and apparatus for the determination of aqueous tritium concentration on a continuous on-line basis. A liquid sample enters the monitoring apparatus from a pressurized process line through a filter and a metering valve. The liquid sample is passed against an air stream in a packed humidifier column to form a moist air stream. The saturated air stream leaving the humidifier is directed through a heated transfer line to a permeation dryer employing a semi-permeable membrane where the tritium content in the form of HTO, $T_2O$, and DTO is preferentially transferred to a second air stream along with water vapor. As used herein, the term tritium material will refer to HTO, $T_2O$, and DTO and mixtures of these substances. The air stream, now containing only tritium material flows past a relative humidity/temperature transducer and then through a flowthrough ionization chamber. The ion chamber response, relative humidity, and temperature parameters are communicated to a process-control computer for calculation of the tritium content of the liquid. The calculation involves a determination of the partial pressure of the $H_2O$ in the ion chamber followed by substitution into a form of the ideal gas law to obtain the tritium concentration per unit mass of $H_2O$.

DESCRIPTION OF THE DRAWINGS

Further objects of the invention, together with additional features contributing thereto and advantages accruing therefrom will be apparent from the following description of one embodiment of the invention when read in conjunction with the accompanying drawings.

Referring now to FIG. 1, there is shown a schematic of an apparatus for analyzing tritium concentration on a continuous basis from an aqueous effluent stream. The apparatus of the subject invention samples the effluent liquid from a pressurized process line 10. The liquid is introduced into a packed humidifier column 11 by line 13, where the liquid 12 is contacted with the air from line 16 flowing countercurrently. The air has been previously dried by drying means 14, which may comprise desiccant or other known drying means. The liquid 12 which drains to the bottom of the humidifier column 11 is pumped back into process line 10 via exit line 15. The air is thus saturated with water vapor and other gases present in the liquid 12 and is continuously being transferred from the humidifier column 11 through line 17 to permeation dryer 19. The transfer line from 17 from humidifier column 11 to the permeation dryer 19 may be heated by any of various means such as heat tape 31.

In the permeation dryer 19, the liquid saturated air stream selectively transfers the water vapor and the tritium material to a second air stream in a manner to be described. The second air stream, now containing the tritium material and moisture flows past relative humidity/temperature transducer 33 and then through a flow-through ionization chamber 35. The tritium concentration is measured in the ionization chamber as known in the art and the results are communicated to a process control computer for the calculation of the tritium content of the second air stream. The calculation involves determination of the partial pressure of $H_2O$ and the ion chamber followed by substitution into a form of the ideal gas law to obtain the tritium concentration per unit mass $H_2O$, all as set forth in more detail below.

Typical continuous air flow ionization chamber systems which may be used with the subject invention and have stainless steel chambers of the Kanne design with a matched gamma-compensated chamber. Both vibrating reed electrometers and log picoammeters are used to measure the ionization current. Tritium detection down to 1 $\mu$ Ci/$M^3$ is possible. If a matched gamma-compensated chamber is not used, it may be desirable to locate the systems in remote shielded areas to minimize the interference from external gamma background radiation. When this is necessary, long sampling lines must then be used. The use of ionization chambers in a monitor of the subject invention provides for a rugged, convenient, and trouble-free apparatus with a response time of seconds. Sensitivity is considered good to moderate and varies from 0.1 to 10 $\mu$Ci/$M^3$. The factors affecting this sensitivity are the chamber volume and the amplifier. Since there is no discrimination against other radionuclides with the use of such ion chambers, all interfering radionuclides and the like must be separated out beforehand through the use of the permeation dryer, as will be described.

Figure 1:
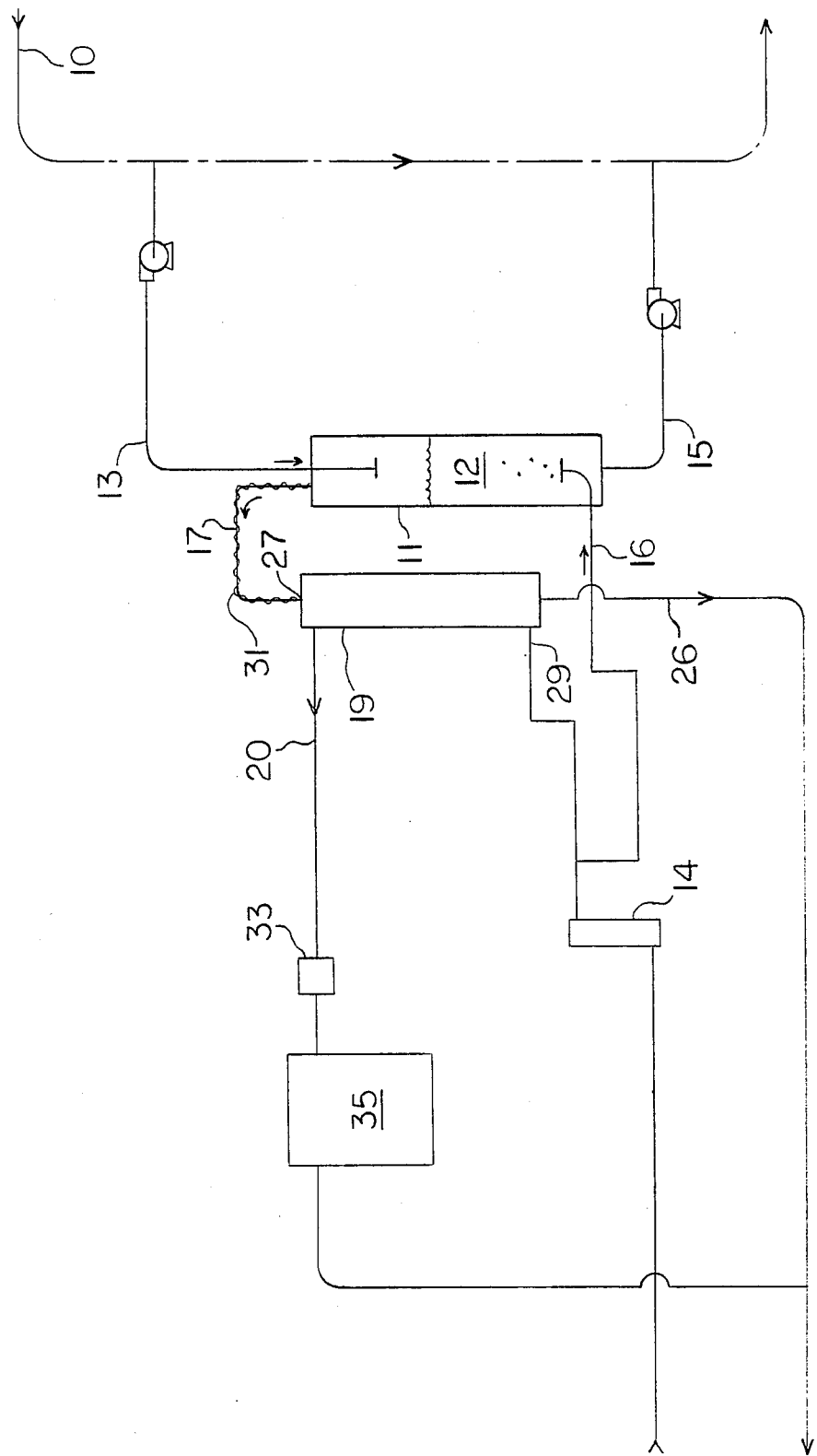
FIG. 1 is a schematic of the aqueous tritium analysis apparatus of the subject invention.
Figure 2:
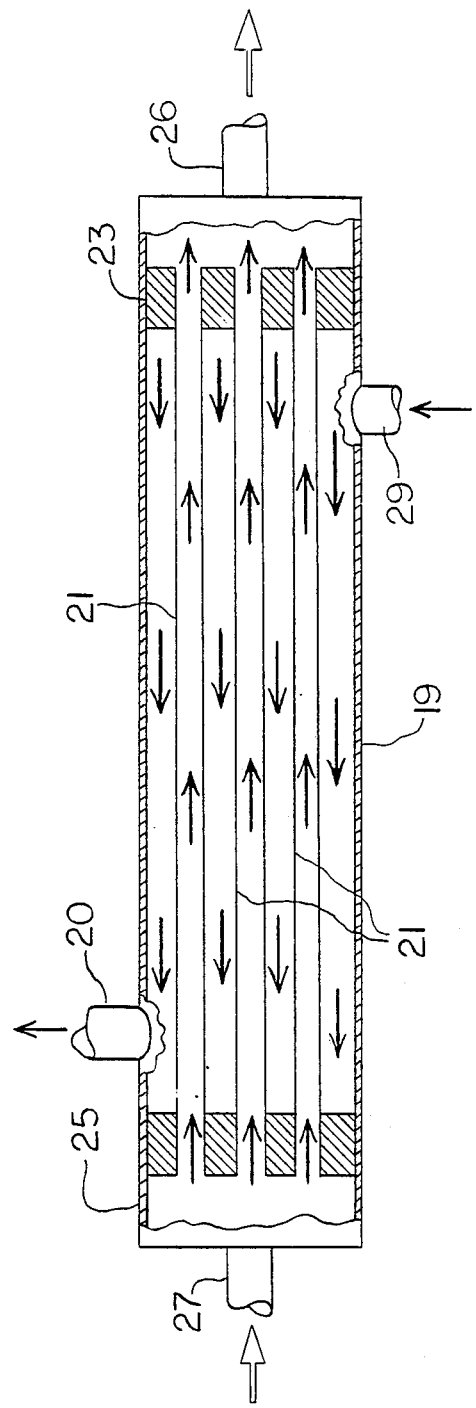
FIG. 2 is a schematic diagram of a permeation distillation dryer used in the tritium analysis apparatus of the subject invention.

One embodiment of the permeation dryer of the subject invention is shown in schematic in FIG. 2. The permeation distillation dryer is fabricated by shaping semi-permeable polymeric membranes into thin wall tubes 21, typically, 0.064 centimeters thick and 60 centimeters in length and mounting as many as 200 tubes into common headers 23. The polymeric semi-permeable membrane is formed of tetrafluoroethylene/perfluorosulfonic acid copolymer, available from E. I. duPont de Nemours & Co. as NAFION. This multiple tube pack is sealed inside a 4 centimeter diameter stainless steel shell 25. The moist sample stream enters in one side of the permeation dryer, while a purge stream, dried by passage through a desiccant or like drying means, enters the permeation drier through purge inlet 29 for flow opposite the sample stream. In the permeation distillation dryer, the sample and the tritium enters by the sample inlet 27, contacts the inner wall of the polymeric membrane tube 21, and the tritium material and water continuously and selectively diffuses through the polymeric membrane into a purged stream. The purged stream transfers the purified tritium material through purge outlet 20 to the on-line detector, i.e., the ionization chamber. The sample stream exits the permeation dryer through sample stream outlet 26.

The operation of the analyzer apparatus of the subject invention is as follows: liquid containing tritium material is sampled from the pressurized process line 10. The liquid then passes through a humidifier column 11 where it is contacted with previously dried air flowing counter-currently. The liquid drains to the bottom of the bed and is pumped back into the process line 10. The air leaving the humidifier column 11 is saturated with water vapor and other gases present in the liquid. The humidity and tritium material in the air stream can be selectively and quantitatively transferred to a second air stream by permeation dryer 19. Finally, the second air stream now containing only water vapor and tritium material is analyzed for tritium concentration using ionization chamber 35, and relative humidity using a solid state sensor 33. The concentration of tritium material in the original liquid may then be calculated from the tritium concentration, humidity, and temperature.

To calculate the tritium activity in a liquid sample from measured quantities, the partial pressure of $H_2O$ in the ion chamber is determined, followed by substitution into a form of the ideal gas law to obtain the mass of $H_2O$ per unit volume of gas. Measurement of the dew point and temperature, or alternatively, the relative humidity and temperature is sufficient to fix the partial pressure of $H_2O$ in the ion chamber. A total pressure measurement is not necessary as long as it does not vary more than a few mm Hg from calibration conditions. The ion chamber is vented to atmospheric pressure, about 645 mmHg. The monitor is vented to an off gas line maintained at a constant 10" $H_2O$ vacuum. The mass per unit volume is then $$M = P(H_2O) \cdot 18/RT$$

where $P(H_2O)$ is the partial pressure of water vapor, 18 is the molecular weight of $H_2O$, R is the gas constant, T is temperature, and M is mass per unit volume. The tritium activity in the original liquid sample, $A(1)$, is given by $$A(1) = A(g)/M$$

where $A(g)$ is the ion chamber response in u Ci tritium per unit volume.

$A(g)$ contains two factors. The first is the actual ion chamber output when calibrated with dry HT gas in air. The second is an empirical correction factor $F(c)$ which accounts for the response difference between HT and HTO and non-ideality of water vapor in the calculation of M. $(F(c))$ is determined by observing the monitor response, $A(1)$ to a liquid sample of known activity. In practice this factor has been slightly greater than unity.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments and equivalents falling within the scope of the appended claims.

Various features of the invention are set forth in the following claims.

We claim:

1. A method for continuously and quantitatively measuring the tritium activity present in a liquid aqueous solution containing tritium material and other radioactive material comprising:

contacting the solution with a first stream of dried air to vaporize a portion of the solution to form a first moist air stream containing tritium material and said other radioactive material;

passing said first moist air stream through one side of a permeation barrier means while passing a second stream of dried air through the opposite side of said barrier means so that the moisture and the tritium material pass through said barrier means to form a second stream of moist air while said other radioactive material remains in said first stream;

sensing moisture content and the temperature of said second stream of moist air; and sensing the quantity of tritium material in said second stream of moist air, such that the moisture, temperature, and quantity of tritium material in the air stream are indicative of the concentration of tritium activity in the aqueous solution.

2. The method of claim 1 wherein said permeation barrier comprises a plurality of tubes secured within a shell, said tubes being formed of a semipermeable membrane.

3. The method of claim 2 further including separating said moisture and said tritium material from said first moist air stream by selectively permitting passage of said moisture and said tritium material through said semi-permeable membrane to form said second stream of moist air.

4. The method of claim 2 wherein said semipermeable membrane is formed of tetrafluoroethylene/perfluorosulfonic acid copolymer.

5. The method of claim 1 wherein said first stream of dried air forms said first moist air stream by passing said first stream of dried air through a humidifier column.

6. The method of claim 1 wherein the step of sensing the quantity of tritium material includes passing said second stream of moist air into an ionization chamber.

7. A method for quantitatively and continuously measuring the tritium activity present in a liquid aqueous process stream within a nuclear facility and other radioactive and non-radioactive constituents comprising the steps of:
   drying a first air stream;
   contacting the liquid stream with said first air stream in a humidifier column to form a moist air stream containing tritium material and said other constituents;
   drying a second air stream;
   heating the moist air stream;
   passing the moist air stream through a permeation drier means and transferring the moisture and tritium material to said second air stream while said other constituents remain in said first stream;
   passing said second stream past a humidity and temperature detection means;
   sensing the moisture content and the temperature of the second stream of air;
   passing said second stream into an ionization chamber;
   sensing the concentration of tritium activity in said second stream, such that the moisture, temperature, and quantity of tritium in said second air stream are indicative of the concentration of tritium activity in the aqueous process stream.

8. The method of claim 7 further including transferring said moisture and tritium materials from said moist air stream to said second air stream by passing said moist air stream through a semi-permeable membrane, such that the tritium materials and moisture are preferentially permitted passage and said other constituents are rejected.

9. Apparatus for quantitatively and continuously measuring the tritium concentration present in a liquid aqueous effluent stream containing tritium materials together with other radioactive and non-radioactive materials comprising:
   a humidifying means;
   a first line connecting said liquid stream with said humidifying means for the flow of said liquid effluent thereto;
   a first drying means for drying a first air stream and introducing said dried air to said humidifying means;
   a permeation drier;
   a second line connecting said humidifying means to said permeation drier means for the passage of a moist air stream
   from said humidifying means to said permeation drier means;
   said permeation drier means separating the tritium materials and moisture from said moist air stream into a second air stream;
   a third line for carrying said second air stream to a humidity sensing means, a temperature sensing means,
   and an ionization chamber; and
   whereby the concentration of tritium activity is sensed in said second air stream, as well as the moisture and temperature of said second air stream, said parameters being indicative of the concentration of tritium activity in said aqueous effluent.

10. The apparatus of claim 9 wherein said second line is heated.

11. The apparatus of claim 10 wherein the heat applied to said second line is applied by heat tape.

12. The apparatus of claim 9 wherein said permeation drier includes a semi-permeable membrane of tetrafluoroethylene/perfluorosulfonic acid copolymer.

* * * * *